United States Patent [19]

Takasaki et al.

[11] Patent Number: 5,757,356
[45] Date of Patent: May 26, 1998

[54] INPUT DATA DISPLAY DEVICE

[75] Inventors: Yukio Takasaki, Kyoto; Takashi Imamura, Kyoto-fu, both of Japan

[73] Assignee: Omron Corporation, Kyoto, Japan

[21] Appl. No.: 654,016

[22] Filed: May 28, 1996

Related U.S. Application Data

[63] Continuation of Ser. No. 386,173, Feb. 9, 1995, abandoned, which is a continuation of Ser. No. 40,989, Mar. 31, 1993, abandoned.

[30] Foreign Application Priority Data

Mar. 31, 1992 [JP] Japan ............... 4-076875

[51] Int. Cl.$^6$ .................................................. G09G 5/36
[52] U.S. Cl. .................................. 345/133; 345/145
[58] Field of Search .................................. 345/173, 174, 345/163, 157, 156, 145, 146, 133, 134, 135, 139, 140; 178/18, 19

[56] References Cited

U.S. PATENT DOCUMENTS

| | | | |
|---|---|---|---|
| 5,005,116 | 4/1991 | Fujital | 364/188 |
| 5,093,796 | 3/1992 | Takada | 364/188 |
| 5,122,957 | 6/1992 | Hattori | 364/424.02 |
| 5,239,458 | 8/1993 | Suzuki | 364/188 |

FOREIGN PATENT DOCUMENTS

| | | |
|---|---|---|
| 043201 | 1/1982 | European Pat. Off. |
| 252171 | 1/1988 | European Pat. Off. |
| 390164 | 10/1990 | European Pat. Off. |
| 0164405 | 12/1991 | Japan ............... 364/188 |

OTHER PUBLICATIONS

"User Manual", 1992, pp. 118 to 125.
IBM, "Method for converting charts in interactive display system", C.C. Himelstein, Feb. 1985, pp. 5060–5061.
IBM Techiniccal Disclosure Bulletin, vol. 33, No. 6A, Nov. 1990, pp. 291–293.
IBM Technical Disclosure Bulletin, vol. 33, No. 7, Dec. 1990, pp. 120–122.
Patent Abstracts of Japan, vol. 6, No. 100, (P-121) JP-A-57 031 031, Feb. 1982.

*Primary Examiner*—Xiao Wu
*Attorney, Agent, or Firm*—Dickstein Shapiro Morin & Oshinsky LLP

[57] ABSTRACT

An input data display device makes it easier to input properly correlated relative corrections for a number of parameters. Relative amounts by which each of a number of parameters is to be adjusted can be displayed on the screen in a manner which shows their ranges and possible correlation. The data are input when the operator touches spots which he selects on the display screen. The pressure of his finger causes data to be generated which represent those input positions. A calculation device calculates output-ready relative correction values for the various parameters based on these input position data. These values are transmitted to the connected device.

2 Claims, 4 Drawing Sheets

INPUT DATA DISPLAY DEVICE

This application is a continuation of application Ser. No. 8/386,173, filed Feb. 9, 1995, now abandoned, which is a continuation application of Ser. No. 08/040,989, filed Mar. 31, 1993, now abandoned.

FIELD OF THE INVENTION

This invention concerns an input data display device which can be connected to various types of control devices. It allows an operator to input data more visually so that an interactive input operation is possible.

BACKGROUND OF THE INVENTION

Furnaces and other heating devices use temperature adjusters (control devices) to control the heat sources so as to maintain heat at a given temperature. The control parameters for this type of temperature control include overshoot, response and hunting parameters. When the temperature control is faulty, it will be necessary to make relative adjustments in the control parameters corresponding to the existing quality of temperature control. If, for example, a proportional-integral-derivative (PID) control circuit is being used to control temperature, changing the relative values of each parameter and properly adjusting the PID gains will return the quality of the temperature control to normal.

In the past, when the relative values of each of the aforesaid parameters needed to be changed, the corrected values were actually input via a keyboard. However, changing the relative values entails taking into account the correlation of the corrected values with various other parameters. It is difficult and extremely time-consuming to determine, in a correlative fashion, the relative correction to be applied to each parameter.

For example, if the operator knew that the state of the temperature control involved no hunting, a large overshoot, and a response which is slightly faulty, then he would modify the relative values so as to make a large correction in the overshoot and a small correction in the response. However, the corrected values for overshoot and response must be determined in a correlative fashion. Determining a relative correction of the value for each parameter requires a great deal of skill acquired through experience.

SUMMARY AND OBJECTS OF THE INVENTION

In view of the difficulty of correlating corrections to parameter behavior, as evidenced by the above example, this invention provides, as its primary object, an input data display device which enables an operator to input values for the relative correction of a number of parameters which are properly correlated. When this invention is used, correlated corrections for a number of parameters are input via a display screen. Data representing these input positions are used to compute output values for relative corrections for each parameter. The values which have been computed are then transmitted to equipment connected to the input data display device.

It is another object of the invention to provide an input data display device that is equipped with a means to display each of the aforesaid relative correction values which are to be output.

It is yet another object of the invention to provide an input data display device having a means to display a control status graphically over time on a display.

It is another object of this invention to display the relative correction values on the display screen.

It is another object of this invention to provide a display of the graph of each of the control parameters on the display screen so that the operator can confirm by graph how the corrections on the controlled device are done.

Briefly described those and other objects are accomplished in accordance with its apparatus aspects by providing an input data display device with a screen on which relative amounts by which each of a number of parameters is to be adjusted. The parameters can be displayed in a manner which shows their ranges and possible correlations. The invention further includes a means to input relative corrections. When input occurs in a position on the screen which the user selects, the device generates data representing that position. A means to compute relative corrections is also provided such that when the input display device receives the data representing input position, it uses those data to compute and output relative corrections for each of the parameters. The device also has a means to transmit the aforesaid relative corrections to equipment connected to the input data display device.

With these and other objects; advantages and features of the invention that may become hereinafter apparent, the nature of the invention may be further understood by reference to the following detailed description of the invention, the appended claims and to the several drawings attached herein.

DETAILED DESCRIPTION OF THE INVENTION

Figure 1:
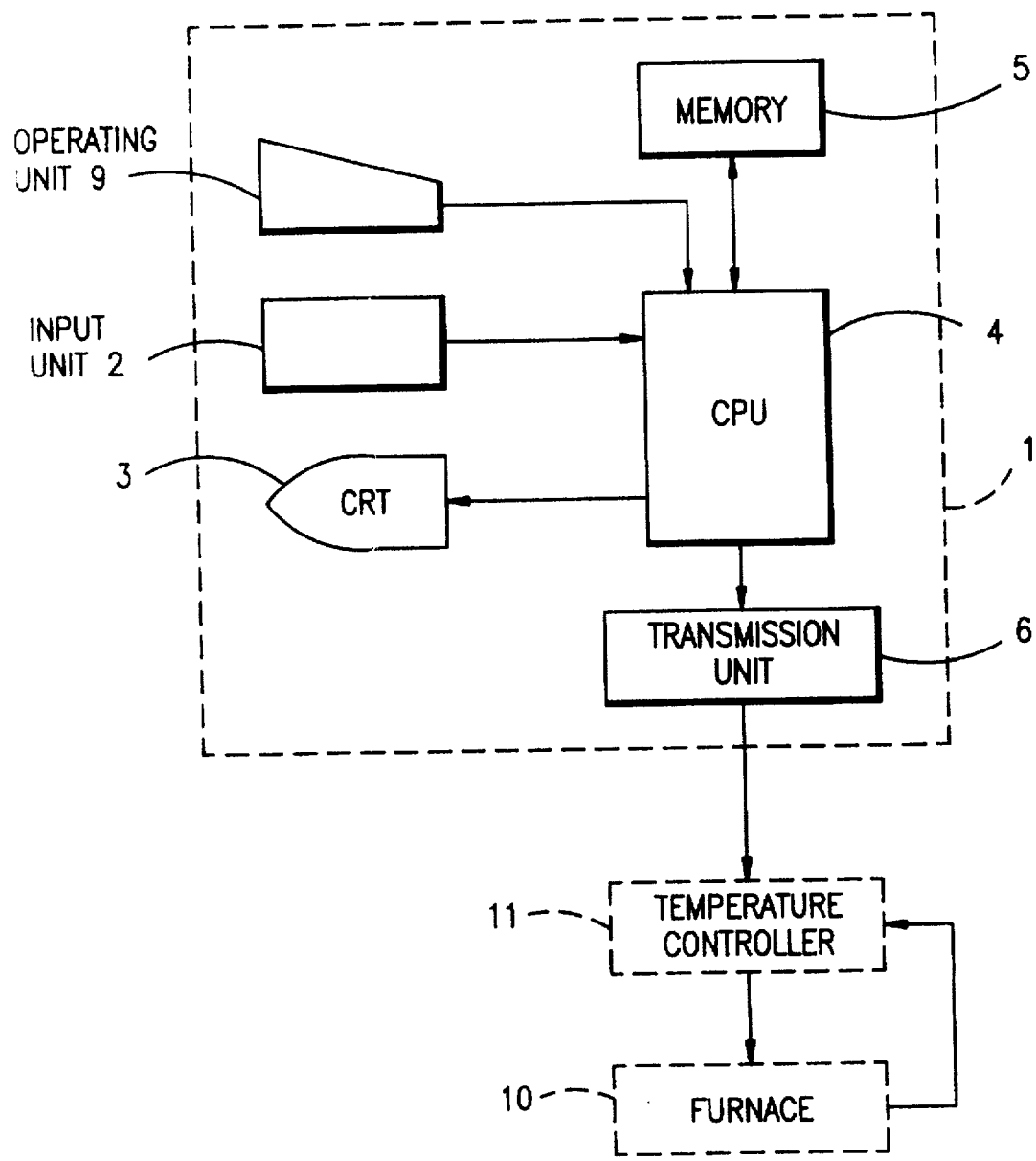
FIG. 1 is a block diagram showing the structure of the invention.

Referring to the drawings, wherein like reference numbers refer to like elements, FIG. 1 illustrates a block diagram showing the configuration of this invention. Specifically, it illustrates an input data display device 1 which includes an input unit 2 for entering the relative corrections for input parameters; a display 3, a central processor 4 which preferably consists of a microcomputer (although any suitable processor may be employed); a memory 5, in which the operating program for the CPU 4 and other various data are stored; a transmission unit 6, which acts to transmit the data; and an operating unit 9. In the illustrated embodiment, the input device 1 is connected to a temperature controller 11, in order to control the temperature of the furnace 10. However, it is contemplated that the input device 1 can be employed to control any suitable device.

The input unit 2 can be of any construction. A preferable construction however involves a transparent laminated resistive sheet for the X/Y coordinates and a film electrode sheet under the resistive sheet. Such construction effectively creates a digitizer. Such a digitizer would produce a signal encoding the coordinates of the position when the pressure produced by, for example, an operator's finger touching that point, is detected. The cathode ray tube (CRT) 3 is the preferred display device although any conventionally known display can be used. The aforesaid input unit 2 is installed on top of the CRT 3 to form a single unit. This combined unit, with its screen capable of receiving input as well as for display, constitutes the device to input the relative corrections. The CPU 4 serves as the device which computes the relative values for correction. The CPU 4 receives the input position data from input unit 2 and computes from these data the relative corrected values to output for each parameter. In addition, it controls display on the CRT 3 of the relative corrections of each parameter in a manner which shows how those corrections are correlated. Finally, the CPU 4 sends output values to the transmission unit 6 and then causes these values to be transmitted from unit 6 to the temperature controller 11.

Figure 2:
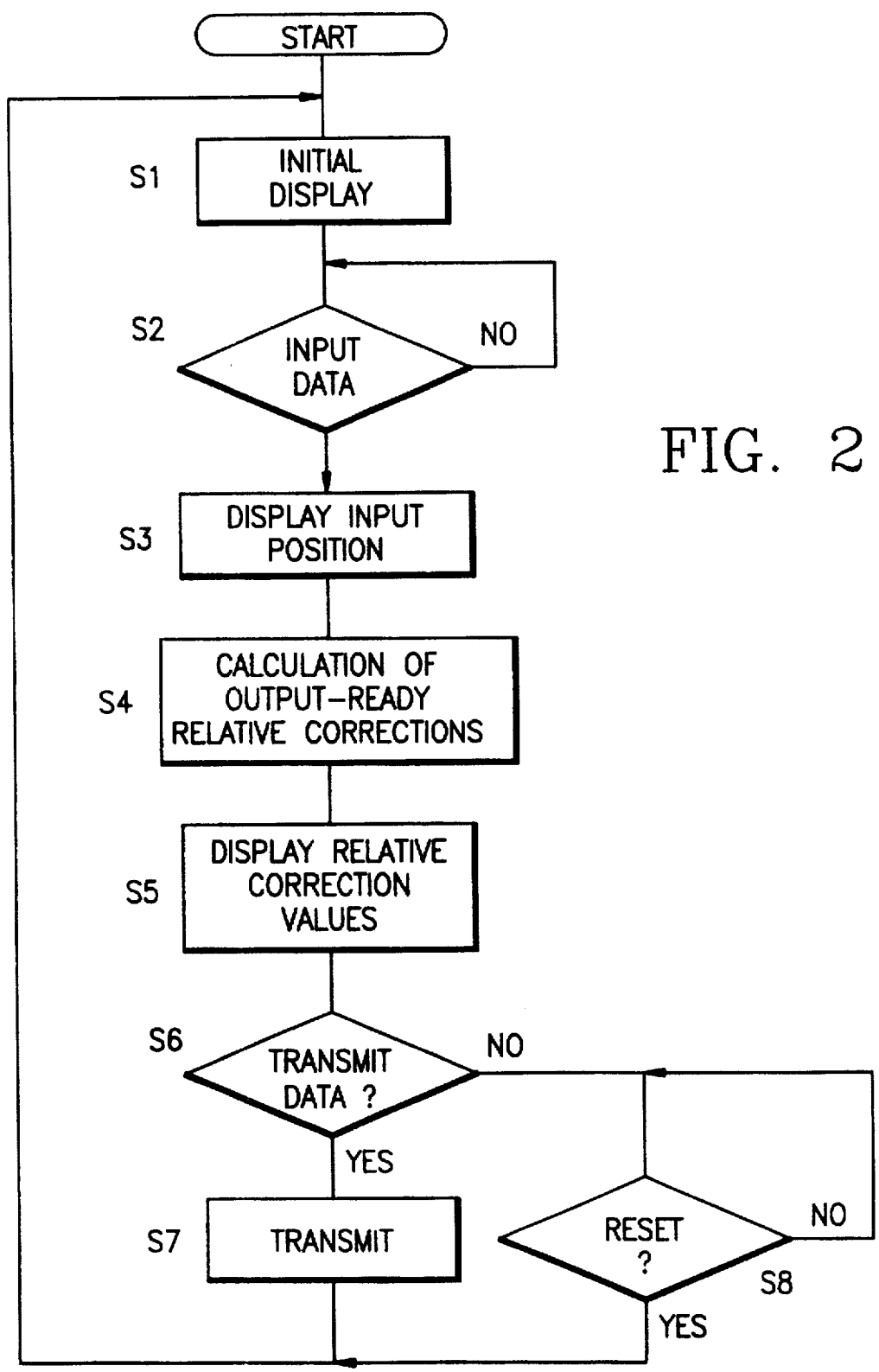
FIG. 2 is a flowchart of the operations which occur during input.
Figure 3:
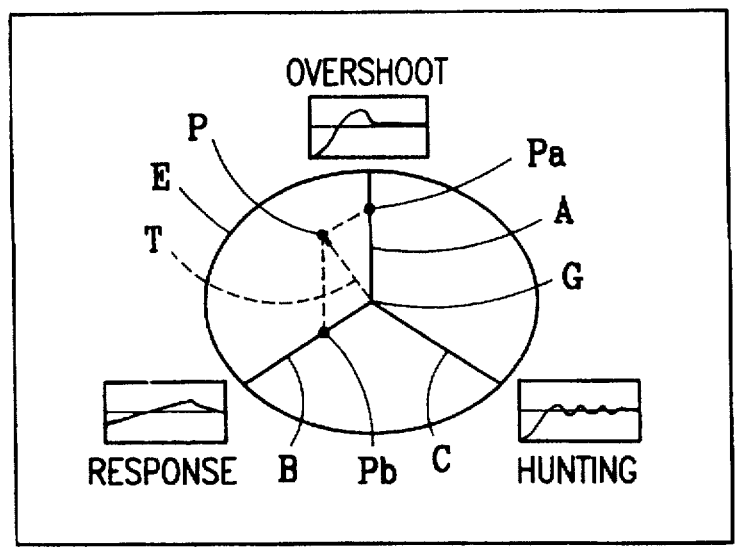
FIG. 3 is an example of a display screen during the input steps of FIG. 2.
Figure 4:
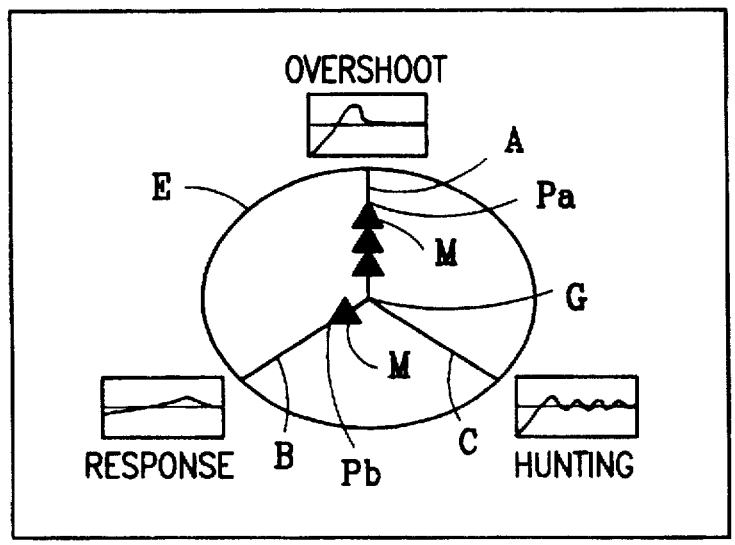
FIG. 4 is an example of another screen display during the input steps of FIG. 2.

With reference to the flowchart in FIG. 2 the operations of input device 1 are shown and the current state displays of the device are shown in FIGS. 3 and 4. In the exemplified application, the current state of control of the temperature of furnace 10, as mediated by temperature controller 11, is as follows: (a) There is no hunting; (b) there is a considerable overshoot; and (c) the response is slightly defective. As a result, the operator must make (a) a large correction in the overshoot and (b) a small correction in the response. No correction in hunting is necessary.

Before any correction data are input, the initial display (shown in FIG. 3) appears on the screen (Step 1). This display shows the distribution of correlated degrees of control applied to the various parameters. As shown in FIG. 3, in the center of the screen 30 is a slightly flattened circle E with an origin G. Radiating from origin G are overshoot axis A, response axis B and hunting axis C, which roughly divide the circle into three segments. Origin G represents zero relative correction for each of the axes A, B and C. The points where the axes meet the periphery of the circle E represent maximum relative corrections. Input unit 2, which as described with reference to FIG. 1, is mounted on the surface of CRT 3, has fixed coordinate positions which match those of circle E, origin G and axes A, B and C.

Using this input data display device, and the above control conditions, the user desires to make a large correction in the overshoot and a small correction in the response. The operator will then press point P on the surface of input unit 2 (Step 2). This point is in the area in circle E between overshoot axis A and response axis B. It is close to overshoot axis A (thus representing a small correction in the response axis B) and near the periphery of the circle E for that axis as well. The position to press is chosen intuitively to correspond to the desired correction. Pressing the screen 3 causes the input unit 2 to generate a signal which represents the coordinates of the position that was pressed. When this signal is generated, the spot which was touched is displayed on CRT 3 (Step 3). Vector T, which has origin G as its starting point and the coordinate position as its endpoint, is analyzed into its vector components in order to calculate relative correction value $P_a$ for overshoot and relative correction value $P_b$ for response. These relative correction values are then further refined, and finally output-ready relative correction values are calculated as integer values from 1 through 5 (Step 4). In this example, the final relative correction value for the overshoot parameter is 30 "3," and for the response parameter is "1." Based on these output values for relative correction, the CRT 3 displays, as shown in FIG. 4, three black triangles M on overshoot axis A and one black triangle on the response axis B to represent the relative correction values (Step 5).

When the operator views the display, if he believes that the above degree of correction values, are the appropriate ones to rectify the current state of control, he uses the operating unit 9 to initiate a "transmit data" command (Step 6). This command causes the relative correction value corresponding to the display to be sent to the data transmission unit (Step 7). The correction values are then transmitted to temperature controller 11. If the operator on viewing the display feels that the values are not correct, he uses the operating unit 9 to initiate a "reset" command (Step 8). This will cause the CRT screen to resume its initial display, and he can then input different relative corrections.

As a consequence with input unit 2, pressing a single spot makes it possible for a number of properly correlated relative correction values to be output to the temperature controller 11. Furthermore, these values can be confirmed by CRT 3 before being output. These relative correction values, then, offer an effective way to rectify the state of control.

In the embodiment discussed above, data were input via a digitizer overlaid on the screen of CRT 3. However, it would also be possible to use either a mouse, key input, or move a cursor to enter the correction data.

Furthermore, the input data display device 1 is usually separate from the devices to which it is connected, such as a temperature controller 11. However, the present invention can include an input data display device 1 which is built into the controlled equipment.

Figure 5:
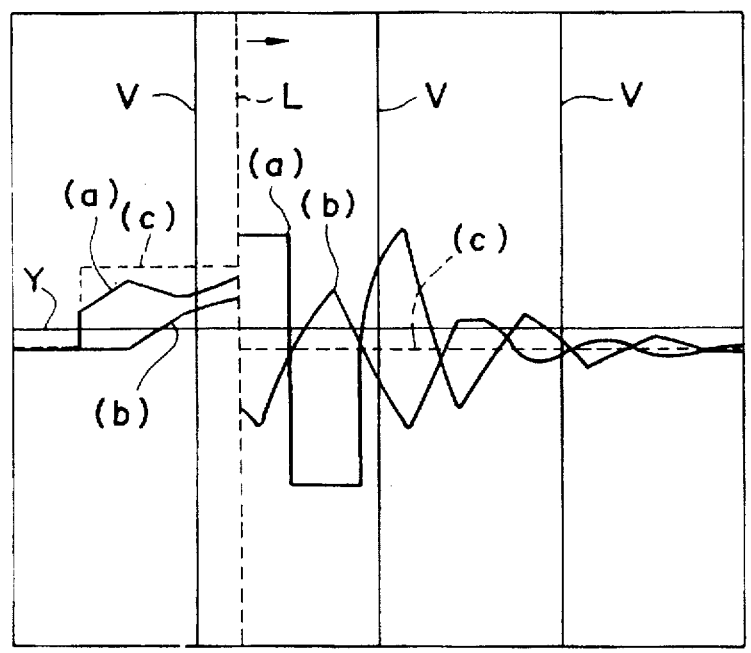
FIG. 5 is an example of a graphic display produced according to this invention.

Referring now to FIG. 5, the graph display operation performed by CRT 3 in the example discussed above, is shown. This display operation can be performed before the relative correction values discussed above have been output. It is initiated by a "display graph" command input via the operating unit 9. The graph of FIG. 5 is based on temperature variation data associated with the state of control (for example, control temperature, heating temperature and ambient temperature), which are received from the temperature controller 11.

Specifically, FIG. 5 shows a graphic display with three sets of temperature data, (a), (b) and (c), which were received from the temperature controller 11. The dotted line L on the screen erases whatever vertical line (x coordinate n) is written in and writes in a new vertical line L on the line where the old data are written, one line width to the right (x coordinate: n+1). The latest data received are written in where the vertical line was erased (x coordinate: n).

Figure 6:
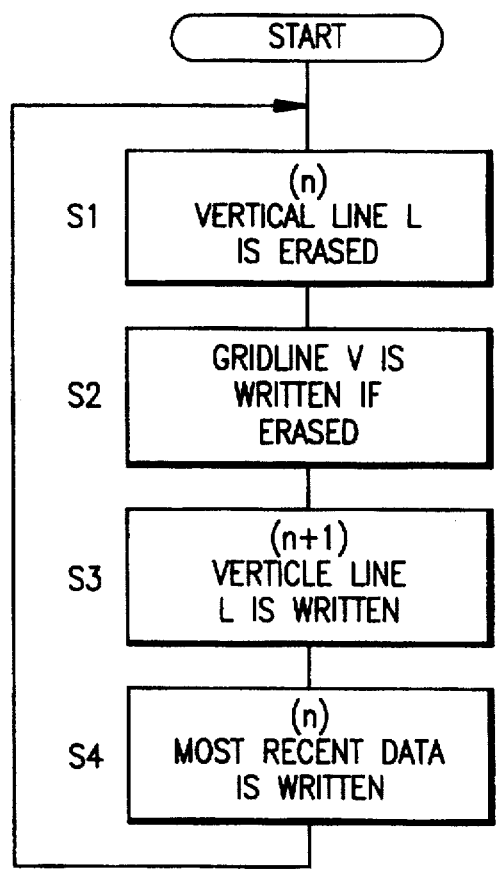
FIG. 6 is a flow chart of the operations for producing the graphic display of FIG. 5.

FIG. 6 is a flowchart illustrating the operations for generating the graph of FIG. 5. If the graph has a grid line V in the location where the vertical line was erased in Step 1, this grid line V is written in as Step 2. Line Y indicates the reference level. As the operation described in Steps 1 to 4 is performed repeatedly, vertical line L moves from left to right on the screen as time elapses. As line L moves, the old data are replaced by the most recent data. This type of display allows the display of data graphically over time with minimum rewriting.

As explained, this invention has a graphic display which allows the operator to use his intuition to input correlated relative corrections for a number of parameters. This system makes it easy to obtain properly correlated relative corrections for each of the parameters. It allows relative correction values to be determined in a correlative fashion without requiring a high degree of operator skill. Furthermore, displaying the relative values allows the displayed data to be verified, thus enabling the operator to determine the relative corrections more accurately.

Although only a preferred embodiment is specifically illustrated and described herein, it will be appreciated that modifications and variations of the present invention are possible in light of the above teachings and within the purview of the appended claims without departing from the spirit and intended scope of the invention.

What is claimed is:

1. An input data display device for entering parameter control data for a controller, said input data display device comprising:

a display device for displaying respective axes, each of which represents an associated output control parameter, said axes having a common origin at the center of a substantial circular shape and terminating at the perimeter of said substantially circular shape, said axes forming between them wedge shaped areas on said display device;

said axes respectively representing interrelated control parameters for a controller, which parameters include overshoot, hunting and response;

means for selecting a location on said display device to thereby input position data which position data, by virtue of its location on said display device and relationship to each of said axes, represents simultaneous corrections to be made in said interrelated control parameters;

means responsive to said selected location for adjusting one or more of the output values for said parameters in accordance with the selected location;

means for outputting said plurality of adjusted output parameter values; and said display device displaying said plurality of adjusted output parameter values respectively on said axes;

wherein selection of a said location within one of said wedge shaped areas corrects control parameters associated with the axes bordering said one wedge shaped area.

2. The input data display device of claim 1, further comprising:

means to display a plurality of variation data corrected by said plurality of output parameters graphically over time; and transmission means for transmitting said plurality of output values to said controller.

* * * * *